United States Patent
Qiu et al.

(10) Patent No.: US 10,122,834 B2
(45) Date of Patent: Nov. 6, 2018

(54) METHOD AND APPARATUS FOR OPERATING AN ICAP SERVER

(71) Applicant: Telefonaktiebolaget LM Ericsson (publ), Stockholm (SE)

(72) Inventors: Kermit Qiu, Guangzhou (CN); Ken Dai, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 352 days.

(21) Appl. No.: 15/036,243

(22) PCT Filed: Nov. 15, 2013

(86) PCT No.: PCT/CN2013/087192
§ 371 (c)(1),
(2) Date: May 12, 2016

(87) PCT Pub. No.: WO2015/070426
PCT Pub. Date: May 21, 2015

(65) Prior Publication Data
US 2016/0301780 A1    Oct. 13, 2016

(51) Int. Cl.
*H04L 29/08*    (2006.01)
*H04L 29/06*    (2006.01)

(52) U.S. Cl.
CPC .............. *H04L 69/22* (2013.01); *H04L 67/02* (2013.01); *H04L 67/10* (2013.01); *H04L 67/2823* (2013.01); *H04L 67/42* (2013.01)

(58) Field of Classification Search
None
See application file for complete search history.

(56) References Cited

U.S. PATENT DOCUMENTS

2006/0031404 A1* 2/2006 Kassab ............ G06F 17/30893
                                                             709/218
2007/0038637 A1    2/2007 Taneja et al.
(Continued)

FOREIGN PATENT DOCUMENTS

EP    1 706 832 A1    10/2006

OTHER PUBLICATIONS

ICAP Partial Content Extension draft-icap-ext-partial-content-07 by M. Stecher et al.; Network Working Group; Internet-Draft; Intended status: Standards Track; Expires: Nov. 20, 2010.
(Continued)

*Primary Examiner* — Natisha D Cox
(74) *Attorney, Agent, or Firm* — Baker Botts, LLP

(57) ABSTRACT

A method for operating an Internet Content Adaptation Protocol (ICAP) server is disclosed. The method comprises defining a message transmission policy for clients of the ICAP server according to a content type of messages for transmission to the ICAP server. The message transmission policy comprises a specification of messages for which a particular transmission method is to be applied, the transmission method comprising one of sending a message preview, sending the entire message or not sending the message. Also disclosed are a method for operating an ICAP client, an ICAP server node, an ICAP client node and a computer program product configured, when run on a computer, to carry out a method for operating an ICAP server or an ICAP client.

20 Claims, 6 Drawing Sheets

(56) References Cited

U.S. PATENT DOCUMENTS

| | | | | |
|---|---|---|---|---|
| 2008/0195696 | A1* | 8/2008 | Boutroux | H04L 29/06 |
| | | | | 709/203 |
| 2010/0229236 | A1* | 9/2010 | Rybak | H04L 51/12 |
| | | | | 726/22 |
| 2010/0325217 | A1* | 12/2010 | Mody | H04L 67/2804 |
| | | | | 709/206 |
| 2015/0156183 | A1* | 6/2015 | Beyer | H04L 63/08 |
| | | | | 726/4 |
| 2015/0215186 | A1* | 7/2015 | Alonso Franco | H04L 63/102 |
| | | | | 709/224 |
| 2016/0285882 | A1* | 9/2016 | Brunn | H04L 63/102 |
| 2017/0155666 | A1* | 6/2017 | Seul | H04L 63/1416 |

OTHER PUBLICATIONS

Internet Content Adaptation Protocol (ICAP) by J. Elson et al; Network Working Group; Request for Comments: 3507; Category: Informational; Apr. 2003.

International Search Report for International application No. PCT/CN2013/087192.

Extended European Search Report for Application No./Patent No. 13897685.7-1853/3069490 PCT/CN2013087192—dated Jun. 2, 2017.

* cited by examiner

METHOD AND APPARATUS FOR OPERATING AN ICAP SERVER

PRIORITY

This non-provisional application is a U.S. National Stage Filing under 35 U.S.C. § 371 of International Patent Application Serial No. PCT/CN2013/087192, filed Nov. 15, 2013, and entitled "METHOD AND APPARATUS FOR OPERATING AN ICAP SERVER."

TECHNICAL FIELD

The present invention relates to an ICAP server node and a method for operating an ICAP server, and to an ICAP client node and a method for operating a client of an ICAP server. The present invention also relates to a computer program product configured, when run on a computer, to carry out a method for operating an ICAP server or an ICAP client.

BACKGROUND

Internet traffic has increased significantly in recent years, and a need has arisen to develop scalable architecture for the delivery of Internet services. In place of a single centralised server handling all aspects of client requests, content providers are moving to a model of distributed, geographically diverse content distribution networks, in which a series of origin servers, or surrogates, are distributed within the network. Such architectures share the burden of client requests between several servers, and bring origin servers closer to the end users they are servicing. In addition to the load balancing advantages afforded by such distributed networks, the proximity of a given surrogate to the end user allows a content provider to offer additional user services which might be based for example on geographic location.

The Internet Content Adaptation Protocol (ICAP) is a light weight, HTTP-like protocol specified in Request for Comments (RFC) 3507 and used to extend transparent proxy servers. ICAP enhances distributed content delivery networks by providing transformation services on HTTP messages. The ICAP server receives an HTTP message from a client, which may for example be a surrogate origin server, the ICAP server then performs some transformation of the HTTP message before sending back a response to the client, usually with a modified HTTP message.

ICAP enables simple content transformations to be performed near the edge of the network, instead of requiring updated content from an origin server. This may include for example providing an updated advertisement each time a particular web page is viewed. Instead of requiring an updated page from an origin server each time a page is viewed, a page may be cached near the edge of the network, and an ICAP server used to insert a new advertisement each time the page is viewed. Other edge services may be offered by ICAP servers, including translation of web pages into an appropriate language for the geographical location of an end user, or transformation of web pages to different formats appropriate for particular end user devices, including for example tablet or mobile phone based web browsers.

ICAP servers may additionally enable the offloading of expensive operations from surrogates, so reducing the processing load at the surrogate. Virus scanning is one example of an expensive process that may be offloaded in this way. A surrogate responding to a download request from a user may offload the task of scanning a downloaded program for viruses before accepting the program into its cache. Content filtering may also be implemented via ICAP, with firewalls or surrogates sending outgoing webpage requests to an ICAP server to check that the Uniform Resource Identifier (URI) in the request is allowed before delivering the webpage to an end user.

In order to provide the above discussed functionality, ICAP servers may operate in different modes according to the nature of the task being conducted. In Request Modification (REQMOD) mode, an end user request is first sent to the ICAP for modification before it is forwarded to an origin server or otherwise processed. REQMOD may be used to implement content filtering, with a URI being sent to the ICAP server to determine if access to the URI is allowed. The ICAP server may return the request to the client if the URI is allowed, or return a modified request pointing to a page containing an error message if the URI is not allowed.

In Response Modification (RESPMOD) mode, an ICAP client sends an HTTP response, typically generated by an origin server, to an ICAP server before the response is forwarded to the end user. The ICAP server may modify the response before returning it to the ICAP client, for example conducting virus scanning, content transition or content formatting.

In OPTIONS mode an ICAP server provides configuration information to an ICAP client, enabling the ICAP client to interact with the ICAP server.

In some cases, requests sent by a client to an ICAP server in either RESPMOD or REQMOD may include a preview of the HTTP message for transformation. The preview enables an ICAP server to see the beginning of a new transaction and decide whether to opt out of the transaction before receiving the remainder of the message. Appropriate use of previewing can yield significant performance improvements by avoiding unnecessary transaction load between ICAP clients and servers. However, previewing all messages would introduce a significant additional message load, so ICAP servers may specify to ICAP clients which messages should be previewed to the ICAP server. This specification is based upon the file extension of the Uniform Resource Locator (URL) included in the message to be sent. File extensions that should be previewed are communicated to ICAP clients via a message exchange with the ICAP server operating in OPTIONS mode. ICAP clients may then assess future messages for transmission to the ICAP server to determine if a preview should be sent, based on the file extension of the URL in the message and in accordance with the specification received from the ICAP server.

While the above system for implementation of previewing in ICAP has been effective in the past, the majority of web pages are now dynamic, meaning most URLs do not include a file extension. The advantages that may be gained from effective use of previewing ICAP messages are therefore lost, as ICAP clients have no information on which to determine whether or not a preview should be sent to the ICAP server.

SUMMARY

It is an aim of the present invention to provide a method and apparatus which obviate or reduce at least one or more of the disadvantages mentioned above.

According to an aspect of the present invention, there is provided a method for operating an Internet Content Adaptation Protocol, ICAP, server, the method comprising defining a message transmission policy for clients of the ICAP server according to a content type of messages for transmission to the ICAP server. The message transmission policy comprises a specification of messages for which a particular transmission method is to be applied, the transmission method comprising one of sending a message preview, sending the entire message or not sending the message.

According to some examples of the invention, operation of an ICAP server may further comprise receiving a message from a client of the ICAP server, performing an adaptation on the content of the message, and sending a response to the client including the adapted message content. The adaptation may include a transformation of the message or some other form of processing conducted on the message. Examples of adaptation include translation, formatting, content filtering, advertisement insertion and virus scanning.

In some examples, the method may further comprise defining a plurality of message transmission policies according to a content type of the messages for transmission, each policy concerning a different transmission method. Thus an ICAP server may specify not only those messages for which a particular method (for example preview) is to be used, but also those messages for which other methods should be used, for example messages which should never be sent to the server and messages which should always be sent to the server in their entirety.

In some examples, the method may further comprise instructing a client of the ICAP server to apply the defined policy. In some examples, instructing a client of the ICAP server to apply the defined policy may comprise including at least one header conveying the policy in a response message sent to the client when the ICAP server is operating in OPTIONS mode. The OPTIONS mode response message may in some examples be sent by a specific resource within the ICAP server and may include policies specific to the resource itself as well as global policies that are common to all resources supported on the server.

In some examples, the method may further comprise specifying a default transmission method in the defined message transmission policy. Messages having a content type that is not specified in a message transmission policy may be handled according to the default transmission method.

In some examples, the method may further comprise defining a fallback message transmission policy for messages for which a content type is not available. In some examples, the fallback message transmission policy may be defined according to a file extension of a Uniform Resource Locator, URL, contained in the message. In such examples, existing specifications for messages based on file extensions may be maintained and given a lower priority than the transmission policies defined according to a content type.

In some examples, the method may further comprise defining at least one dedicated message transmission policy for when the ICAP server is opening in Request Modification mode, REQMOD, or for when the ICAP server is operating in Response Modification mode, RESPMOD.

In some examples, the at least one header included in a response message sent to the client when the ICAP server is operating in OPTIONS mode may comprise at least one of Resp-Content-Transfer-Preview, Resp-Content-Transfer-Ignore, Resp-Content-Transfer-Complete, Req-Content-Transfer-Preview, Req-Content-Transfer-Ignore, Req-Content-Transfer-Preview.

According to another aspect of the present invention, there is provided a method for operating an Internet Content Adaptation Protocol, ICAP, server, the method comprising defining a message transmission policy for clients of the ICAP server to be applied when sending messages to the ICAP server, wherein the policy comprises a dedicated message transmission policy for when the ICAP server is operating in Request Modification mode, REQMOD, or for when the ICAP server is operating in Response Modification mode, RESPMOD. The message transmission policy comprises a specification of messages for which a particular transmission method is to be used, the transmission method comprising one of sending a message preview, sending the entire message or not sending the message.

In some examples, the method may further comprise instructing a client of the ICAP server to apply the defined policy. Instructing a client of the ICAP server to apply the defined policy may comprise including at least one header conveying the policy in a response message sent to the client when the ICAP server is operating in OPTIONS mode.

According to another aspect of the present invention, there is provided a method for operating a client of an Internet Content Adaptation Protocol, ICAP, server, the method comprising receiving a message from an entity other than the ICAP server, checking the message for a content type, and if the message includes a content type, applying a message transmission policy corresponding to the ICAP server according to the content type. The message transmission policy comprises a specification of messages for which a particular transmission method is to be used when transmitting to the ICAP server, the transmission method comprising one of sending a message preview, sending the entire message or not sending the message.

In some examples, the method may further comprise, if the message does not include a content type, checking for a file extension of a Uniform Resource Locator, URL, contained in the message, and, if the message includes a URL having a file extension, applying a transmission policy corresponding to the ICAP server according to the file extension.

In some examples, the method may further comprise receiving a message from the ICAP server including a message transmission policy defined by the ICAP server and storing the received message transmission policy in a memory.

In some examples, the ICAP client may be instructed with a default policy for application if no specific policy is defined for a particular message content type or file extension or if no content type or file extension can be extracted from the message.

In some examples, the method may further comprise checking whether the received message is to be transmitted to the ICAP server as a Request Modification mode, REQMOD, request or a Response Modification mode, RESPMOD, request, and applying a message transmission policy corresponding to the ICAP server according to the mode type of the request.

According to another aspect of the present invention, there is provided a method for operating a client of an Internet Content Adaptation Protocol, ICAP, server, the method comprising receiving a message from an entity other than the ICAP server, checking whether the received message is to be transmitted to the ICAP server as a Request Modification mode, REQMOD, request or a Response Modification mode, RESPMOD, request, and applying a message transmission policy corresponding to the ICAP server according to the mode type of the request. The message transmission policy comprises a specification of messages for which a particular transmission method is to be used when transmitting to the ICAP server, the transmission method comprising one of sending a message preview, sending the entire message or not sending the message.

In some examples, the method may further comprise receiving a message from the ICAP server including a message transmission policy defined by the ICAP server and storing the received message transmission policy in a memory.

According to another aspect of the present invention, there is provided a computer program product configured, when run on a computer, to carry out a method according to the preceding aspects of the invention. Examples of the computer program product may be incorporated into an apparatus such as an ICAP server node or an ICAP client node. The computer program product may be stored on a computer-readable medium, or it could, for example, be in the form of a signal such as a downloadable data signal, or it could be in any other form. Some or all of the computer program product may be made available via download from the internet.

According to another aspect of the present invention, there is provided an Internet Content Adaptation Protocol, ICAP, server node, comprising a policy unit configured to define a message transmission policy for clients of the ICAP server according to a content type of messages for transmission to the ICAP server. The message transmission policy comprises a specification of messages for which a particular transmission method is to be applied, the transmission method comprising one of sending a message preview, sending the entire message or not sending the message.

In some examples, the ICAP server node may further comprise an instructing unit, configured to instruct a client of the ICAP server to apply the policy defined in the policy unit.

In some examples, the policy unit may be further configured to define at least one dedicated message transmission policy for when the ICAP server is operating in Request Modification mode, REQMOD, or for when the ICAP server is operating in Response Modification mode, RESPMOD.

According to another aspect of the present invention, there is provided an Internet Content Adaptation Protocol, ICAP, client node, comprising a receiving unit configured to receive a message from an entity other than the ICAP server of which the node is client, an analysis unit configured to check the received message for content type, and a transmission unit configured, if the message includes a content type, to apply a message transmission policy corresponding to the ICAP server of which the node is client according to the content type. The message transmission policy comprises a specification of messages for which a particular transmission method is to be used when transmitting to the ICAP server, the transmission method comprising one of sending a message preview, sending the entire message or not sending the message.

In some examples, the ICAP client node may further comprise a memory unit, and the receiving unit may be further configured to receive a message from the ICAP server of which the node is client including a message transmission policy defined by the ICAP server, and to store the received message transmission policy in the memory unit.

In some examples, the transmission unit may be further configured to check whether the received message is to be transmitted to the ICAP server as a Request Modification mode, REQMOD, request or a Response Modification mode, RESPMOD, request, and to apply a message transmission policy corresponding to the ICAP server which the node is client according to the mode type of the request.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
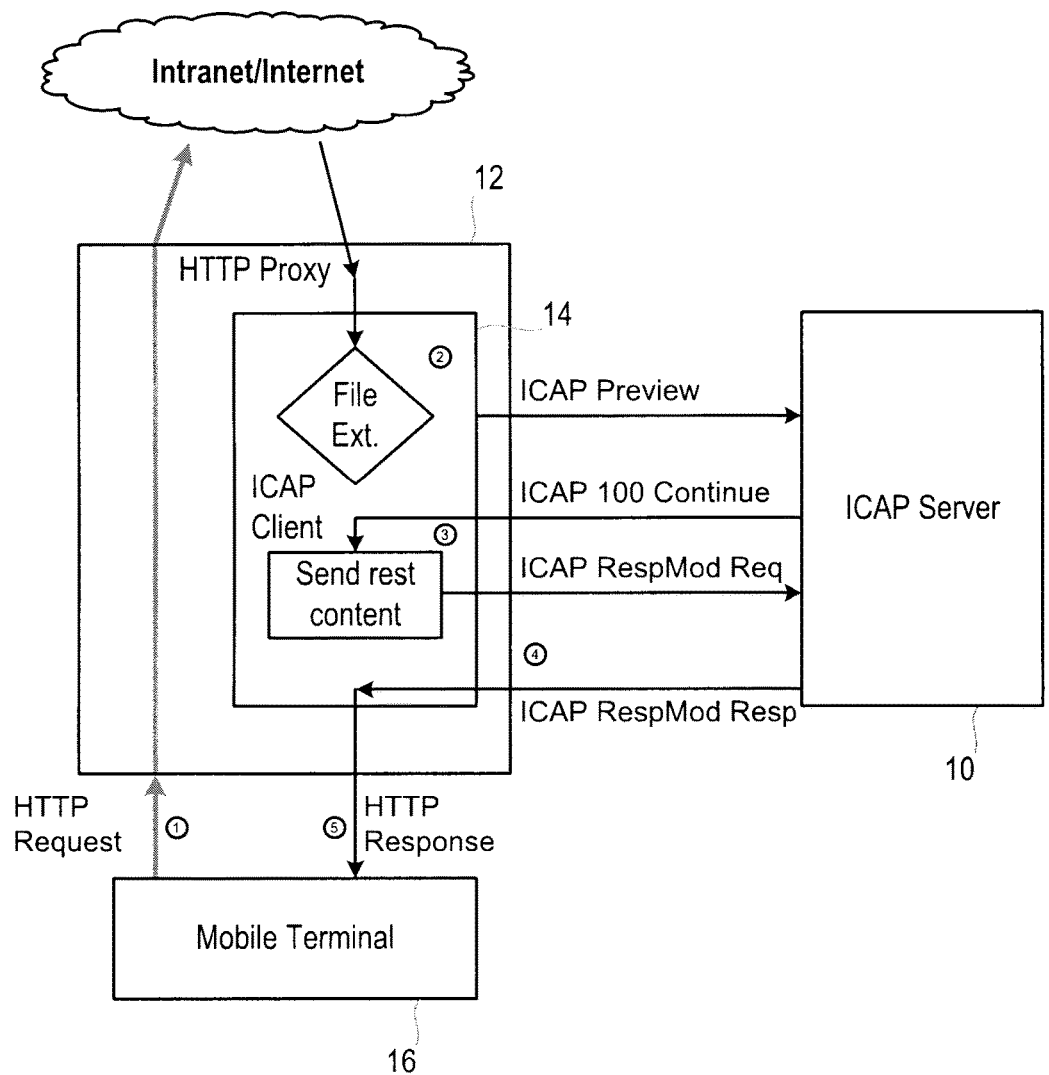
FIG. 1 is a schematic illustration representing operation of an ICAP client and server.

As noted above, an ICAP server may receive a preview of REQMOD or RESPMOD requests in order to determine if the server will accept the request or opt out. FIG. 1 illustrates operation of an ICAP server 10 and HTTP proxy 12 that is acting as an ICAP client. In the illustrated example, the HTTP proxy 12 includes a separate functional unit 14 that operates as the ICAP client for the ICAP server 10. In the example of FIG. 1, the ICAP server is operating in RESPMOD mode, modifying an HTTP response, and the ICAP client 14 is previewing the message to the ICAP server 10. In a first step 1, an HTTP request is raised by a mobile terminal 16. The HTTP request is passed by the HTTP proxy 12 to the origin server over the Internet, and the origin server responds with the requested resource, for example a video stream. Within the ICAP client 14 of the HTTP proxy, the file extension of the response URL is checked in step 2. The file extension of the URL is compared with the file extensions to be previewed to the ICAP server, and in the event of a match, the response message is previewed to the ICAP server in the message "ICAP Preview". The ICAP server 10 receives the preview and determines whether or not to accept the message on the basis of the preview. If the ICAP server 10 decides to accept the message, the ICAP server 10 sends an "I CAP 100 Continue" response to the ICAP client 14 in step 3, prompting the ICAP client 14 to send the full ICAP RESPMOD mode message. The ICAP server 10 then performs its programmed adaptation on the message, for example formatting the URL content to fit a mobile terminal, and then responds to the ICAP client 14 in step 4 with the modified message ICAP RESPMOD response. Finally, the ICAP client 14 forwards the received modified message to the mobile terminal in step 5.

The list of file extensions to be previewed to a particular ICAP server is provided to ICAP clients in the OPTIONS operating mode. OPTIONS is used by ICAP clients to retrieve configuration information, including preview specifications, from the ICAP server. The ICAP client sends an OPTIONS mode request, frequently addressed to a specific resource supported on the ICAP server, and receives an OPTIONS mode response including configuration information which may include information specific to that resource and/or information that is common to all resources supported on the server. The OPTIONS response message includes a series of header field names and corresponding values, conveying configuration information about the ICAP server. Included among these header field names may be headers specific to the transfer of messages to the ICAP server. A list of such headers is included in table 1, which is extracted from RFC 3507, chapter 4.10.2, available from http://tools.ietf.org/html/rfc3507.

TABLE 1

| | |
|---|---|
| Transfer-Preview | A list of file extensions that should be previewed to the ICAP server before sending them in their entirety. This header MAY be included in the OPTIONS response. Multiple file extensions values should be separated by commas. The wildcard value "*" specifies the default behaviour for all the file extensions not specified in any other Transfer-* header (see below). For example: Transfer-Preview. * |
| Transfer-Ignore | A list of file extensions that should NOT be sent to the ICAP server. This header MAY be included in the OPTIONS response. Multiple file extensions should be separated by commas. For example: Transfer-Ignore: html |
| Transfer-Complete | A list of file extensions that should be sent in their entirety (without preview) to the ICAP server. This header MAY be included in the OPTIONS response. Multiple file extensions values should be separated by commas. For example: Transfer-Complete: asp, bat, exe, com, ole Note: If any of Transfer-* are sent, exactly one of them MUST contain the wildcard value "*" to specify the default. If no Transfer-* are sent, all responses will be sent in their entirety (without Preview). |

As noted above, while the easting system of file extension lists has functioned well in the past, the majority of web pages are now dynamic, meaning most URLs do not include a file extension. Thus even when one or more of the above headers is included in an OPTIONS mode response, an ICAP client is unable to apply the specified behaviours of preview, complete or ignore because no file extension is available in the message for comparison with the lists received from the ICAP server.

Figure 2:
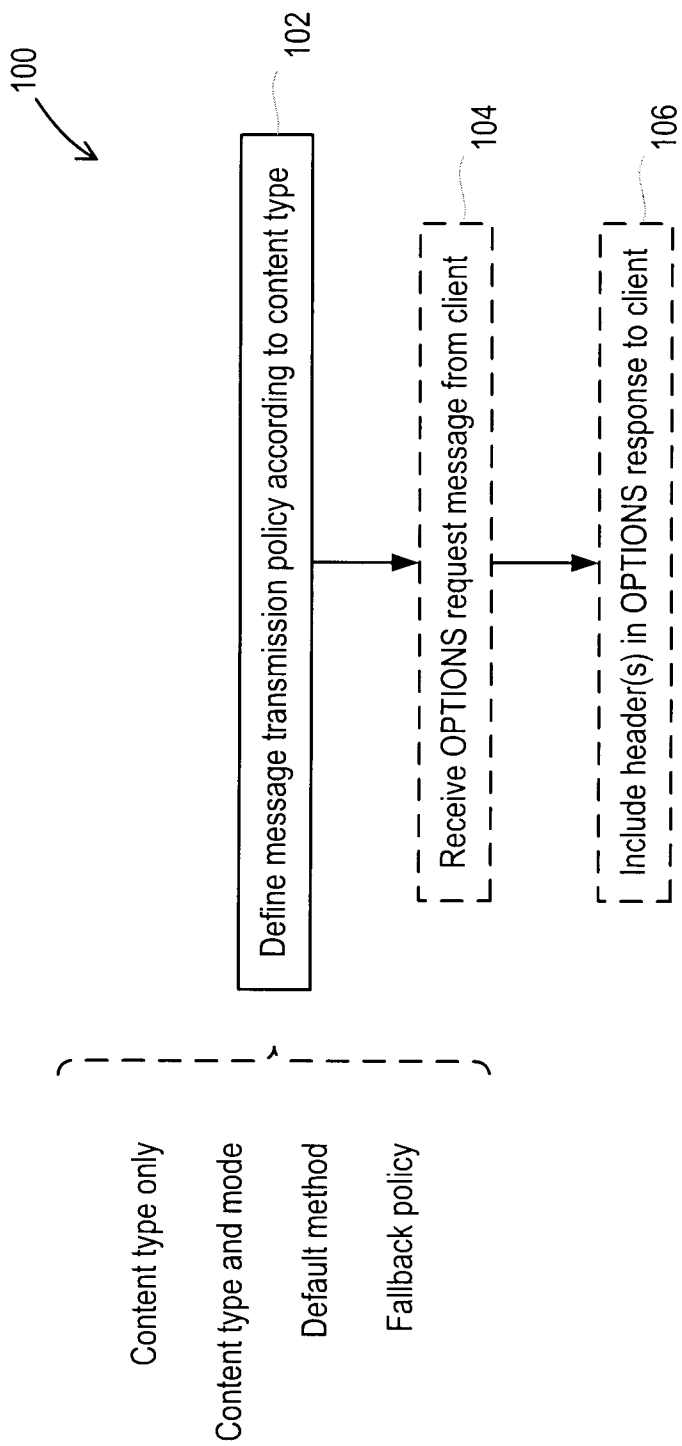
FIG. 2 is a flow chart illustrating steps in a method for operation of an ICAP server.

Aspects of the present invention introduce message transmission policies defined according to content type. FIG. 2 is a flow diagram illustrating steps in a method 100 for operating an ICAP server according to an aspect of the present invention. With reference to FIG. 2, in a first step 102, the ICAP server defines a message transmission policy according to content type. The ICAP server may then receive an OPTIONS mode request from an ICAP client in step 104, and may respond to the request in step 106, including in the response a header or headers conveying the defined message transmission policy to the ICAP client.

The message transmission policy defined in step 102 is a specification of messages for which a particular transmission method should be applied, the transmission method being one of sending a message preview, sending the complete message or not sending the message. As discussed above, the messages are specified according to content type, such that the policy may comprise a message transmission method and a list of content types for which the transmission method should be applied. The content types may include content subtypes, examples of which may include (type/subtype):

Text/plain, richtext,
Multipart/mixed, alternative, parallel, digest
Message/partial, http
Image/jpeg, gif
Audio/basic, MP4
Video/mpeg
Application/pdf, postscript
Model/vrml The above list indicates merely a handful of content types and subtypes for the purposes of illustration. A wide range of content types and subtypes are defined in the art and available for specification of message transmission methods.

The defined message transmission policy may include dedicated policies for operation in RESPMOD and REQMOD. As discussed above, an ICAP server may operate in REQMOD or in RESPMOD, and may implement different functions in the different operating modes. This difference in function may mean that dedicated message transmission policies for each mode are appropriate. For example, REQMOD may be used to implemented access control and may be applied to all messages, regardless of content type. It may therefore be appropriate to apply a policy of transmitting complete messages on all content types when operating in REQMOD. In contrast, RESPMOD may be used to implement content insertion, which may be appropriate for certain HTML content only. Thus it may be appropriate to preview messages having an HTML content type and not to send messages having other content types. The message transmission policy defined in step 102 may therefore specify specific policies for REQMOD and RESPMOD operation.

The message transmission policy defined in step 102 may also specify a default transmission method. The default transmission method may be used by the ICAP client in the event that the content type of the message to be transmitted does not appear in any of the received content type lists specified by the ICAP server.

The message transmission policy defined in step 102 may also include a fallback policy, to be used in the event that the message to be transmitted does not include an indication of content type, or content type cannot be extracted from the message. The fallback policy may for example specify message transmission methods for different file extensions. Thus if message content cannot be determined, an ICAP client may check for file extensions in a URL of the message to be sent, and, if a file extension is present, check the file extension against lists of file extensions provided by the ICAP server to determine an appropriate transmission method from among preview, send complete message and do not send message.

The defined message transmission policy may be communicated to the ICAP client in an OPTIONS response message in step 106. The policy may be transmitted via header field names and corresponding values as set out in table 2 below

TABLE 2

| | |
|---|---|
| Resp-Content-Transfer-Preview | A list of content types that should be previewed to the ICAP server before sending them in their entirety in RESPMOD requests. This header MAY be included in the OPTIONS response. Multiple content types should be separated by commas. The wildcard value "*" specifies the default behaviour for content types not specified in any other Resp-Content-Transfer header (see below). For example: Resp-Content-Transfer-Preview.text/html Resp-Content-Transfer-Preview.text/html, |

TABLE 2-continued

| | |
|---|---|
| | image/png, image/jpg<br>Resp-Content-Transfer-Preview.image/*, text/*<br>Resp-Content-Transfer-Preview. * |
| Resp-Content-Transfer-Ignore | A list of content types that should NOT be sent in the RESPMOD requests to the ICAP server. This header MAY be included in the OPTIONS response. Multiple content types should be separated by commas. Wildcard may be used to replace part or whole content type.<br>For example:<br>Resp-Content-Transfer-Ignore: text/html<br>Resp-Content-Transfer-Ignore: text/html, image/png, image/jpg<br>Resp-Content-Transfer-Ignore: image/*, text/*<br>Resp-Content-Transfer-Ignore: * |
| Resp-Content-Transfer-Complete | A list of content types that should be sent in their entirety (without preview) to the ICAP server in the RESPMOD requests. This header MAY be included in the OPTIONS response. Multiple content types should be separated by commas. Wildcard may be used to replace part or whole content type.<br>For example:<br>Resp-Content-Transfer-Compete: text/html<br>Resp-Content-Transfer-Compete: text/html, image/png, image/jpg<br>Resp-Content-Transfer-Compete: image/*, text/*<br>Resp-Content-Transfer-Compete: * |
| Req-Content-Transfer-Preview | A list of content types that should be previewed to the ICAP server before sending them in their entirety in the REQMOD requests. This header MAY be included in the OPTIONS response. Multiple content types should be separated by commas. The wildcard value "*" specifes the default behaviour for content types not specified in any other Req-Content-Transfer header (see below).<br>For example:<br>Req-Content-Transfer-Preview.text/html<br>Req-Content-Transfer-Preview.text/html, image/png, image/jpg<br>Req-Content-Transfer-Preview.image/*, text/*<br>Req-Content-Transfer-Preview. * |
| Req-Content Transfer-Ignore | A list of content types that should NOT be sent in the REQMOD reguests to the ICAP server. This header MAY be included in the OPTIONS response. Multiple content types should be separated by commas. Wildcard may be used to replace part or whole content type.<br>For example:<br>Req-Content-Transfer-Ignore: text/html<br>Req-Content-Transfer-Ignore: text/html, image/png, image/jpg<br>Reg-Content-Transfer-Ignore: image/*, text/*<br>Reg-Content-Transfer-Ignore: * |
| Req-Content-Transfer-Complete | A list of content types that should be sent in their entirety (without preview) to the ICAP server in the REQMOD requests. This header MAY be included in the OPTIONS response. Multiple content types should be separated by commas. Wildcard may be used to replace part or whole content type.<br>For example:<br>Req-Content-Transfer-Compete: text/html<br>Req-Content-Transfer-Compete: text/html, image/png, image/jpg<br>Req-Content-Transfer-Compete: image/*, text/*<br>Req-Content-Transfer-Compete: * |

The wildcard "*" may be used to specify a default transfer method for content types not explicitly listed, and it may be desirable to specify a default method if any of the content type transfer method headers are included in an OPTIONS mode response.

Any or all of the headers defined above may be included in an OPTIONS mode response, and these may replace or be included with file extension transfer headers as defined in Table 1. If both content type and file extension transfer headers are included in an OPTIONS mode response, a hierarchy is imposed, such that the content type transfer polices are applied as a priority, with the file extension policies being consulted only if message content type is unavailable.

According to one example, the headers disclosed in Table 2 may be included into chapter 4.10.2 of the RFC 3507, with these six headers being given a higher priority than the three Transfer headers already included in this chapter of the standard and set out in Table 1 of the present specification. In order to maintain compatibility with older ICAP clients which may not be configured to handle the newly introduced header fields, an ICAP server may be configured to check an ICAP version string in the request line of an OPTIONS request sent by an ICAP client. If the ICAP version string indicates an older version of ICAP, which does not include the newly introduced header fields, the ICAP server may be configured to send an OPTIONS response including only those headers defined in the ICAP version indicated in the ICAP version string of the OPTIONS mode request.

Figure 3:
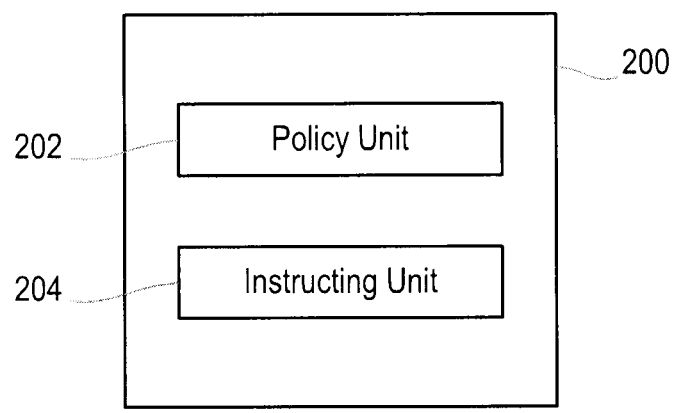
FIG. 3 is a block diagram representing functional units of an ICAP server.

Apparatus for conducting the method of FIG. 2, for example on receipt of suitable computer readable instructions, may be incorporated within an ICAP server node. FIG. 3 illustrates functional units in an ICAP server node 200 which may execute the steps of FIG. 2, for example according to computer readable instructions received from a computer program. It will be understood that the units illustrated in FIG. 3 are functional units, and may be realised in any appropriate combination of hardware and/or software.

With reference to FIG. 3, the ICAP server node 200 comprises a policy unit 202 and an instructing unit 204. The policy unit 202 is configured to conduct step 102 of method 100, defining a message transmission policy according to content type. The instructing unit 204 is configured to conduct step 106 of the method 100, instructing a client of the ICAP server node 200 to apply the defined policy by including appropriate header field and value combinations in an OPTIONS mode response.

Figure 4:
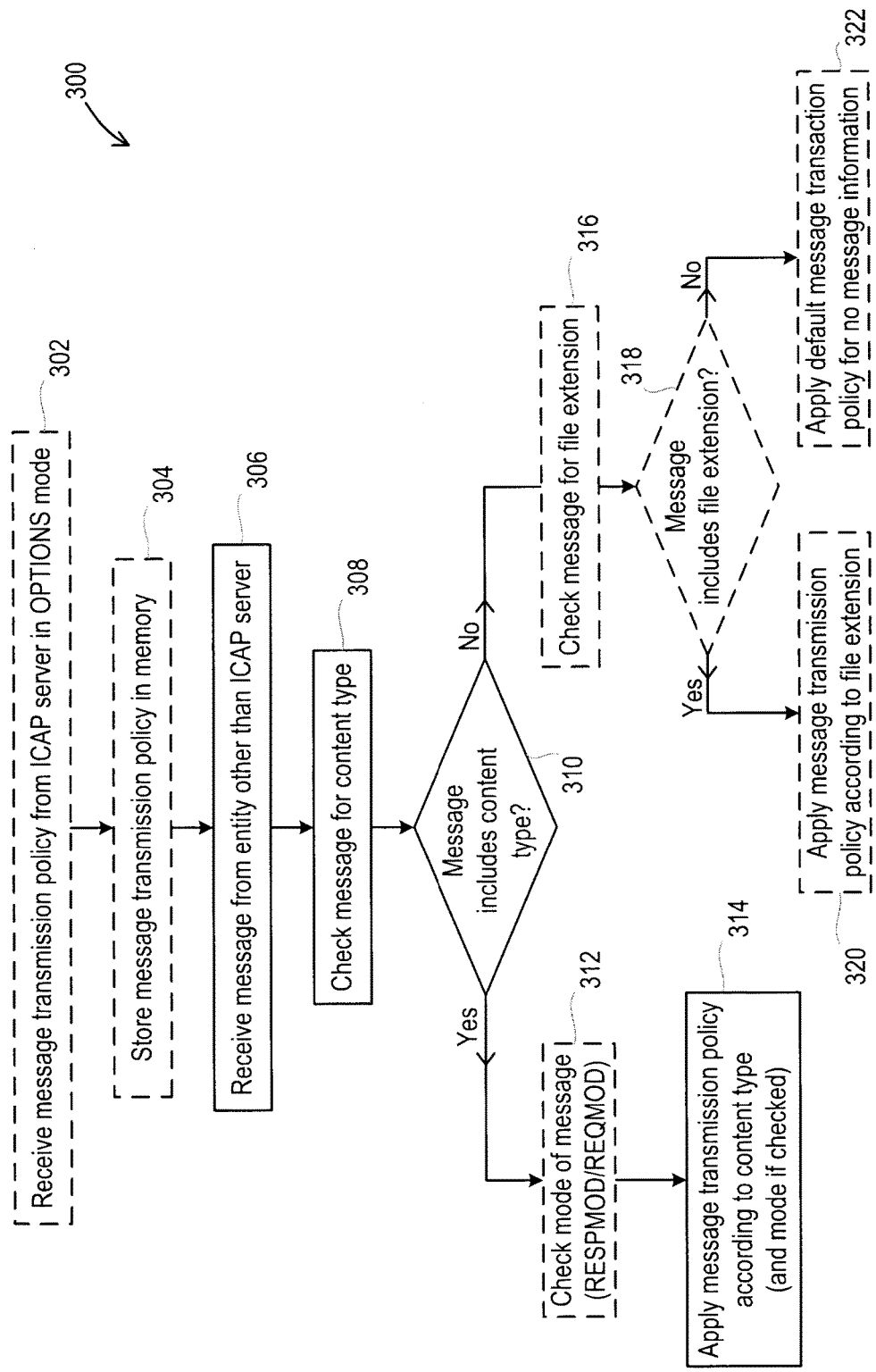
FIG. 4 is a flow chart illustrating steps in a method for operation of an ICAP client.

FIG. 4 illustrates a method of operating an ICAP client, showing how the ICAP client may handle message transmission policies defined by an ICAP server in accordance with the method 100 of FIG. 2.

With reference to FIG. 4, in a first step 302 the ICAP client receives a message transmission policy from an ICAP server via an OPTIONS mode response. The response may be prompted by an OPTIONS mode request sent by the client in order to retrieve configuration information from the ICAP server. The OPTIONS mode response may include a range of configuration data and may also include the message transmission policy in the form of header fields and corresponding values. The header fields may include any or all of the fields illustrated in Table 2. Any, all or none of the header fields in Table 1 may also be included as a fallback policy. In step 304, the ICAP client stores the received message transmission policy in a memory.

In step 306, the ICAP client then receives a message from an entity other than the ICAP server. This may be a message from an end user or from an origin server, surrogate or other entity. In step 308 the ICAP client checks the message for content type. Content type may be indicted in a header field of the message, or in some examples may be extracted from the message body. If the message includes a content type (Yes at step 310), the ICAP client proceeds to check at step 312 whether the message is to be sent to the ICAP server as a RESPMOD message or a REQMOD message. This may involve checking the origin and destination of the message;

a message originating from an end user would be sent to the ICAP server in REQMOD, while a message from an origin server would be a RESPMOD message for the ICAP server.

After checking the operational mode in which the message is to be sent, the ICAP client then applies the appropriate message transmission policy according to content type and mode. This may involve checking the memory of the ICAP client to retrieve the received message transmission policy and comparing the content type and mode of the message to the received content type lists and field headers of the message transmission policy. In determining which transmission method to apply, the ICAP client adopts the longest match principle, as illustrated in the following example.

An ICAP client has a message received from an end user having a content type "image" and subtype "png". The ICAP client determines that the message should be sent to the ICAP server as a REQMOD message (the message having originated from an end user) and checks for received message transmission policies corresponding to the ICAP server. The ICAP client retrieves a message transmission policy including the following three header field and value combinations:

Req-Content-Transfer-Preview image/png
Req-Content-Transfer-Ignore: image/*
Req-Content-Transfer-Complete: *

Appling the longest match principle, the ICAP client determines that the message should be previewed to the ICAP server. A REQMOD message containing image content of a different subtype would not be sent to the ICAP server, as the longest match principle would match this content with the Req-Content-Transfer-Ignore header field. REQMOD messages having a content type other than images would be transferred in their entirety, on the basis of the final wildcard which indicates the default behaviour for content types not elsewhere specified. The longest match principle thus imposes a high to low priority listing of Req-Content-Transfer-Preview image/png, followed by Req-Content-Transfer-Ignore: image/*, and finally Req-Content-Transfer-Complete: *.

Returning to step 310, if the ICAP client determines that the message to be sent to the ICAP server does not include a content type, or content type cannot be extracted from the message, (No at step 310), the ICAP client then proceeds to check, in step 316, if the message includes a file extension. If the message does include a file extension (Yes in step 318), the ICAP client proceeds at step 320 to retrieve and apply a transmission policy according to file extension, which policy may have been received and stored in the memory as a fallback policy in steps 302 and 304. If the message does not include a file extension (No in step 318), the ICAP client proceeds at step 322 to apply a default message transmission policy for messages having no content type or file extension information.

Figure 5:
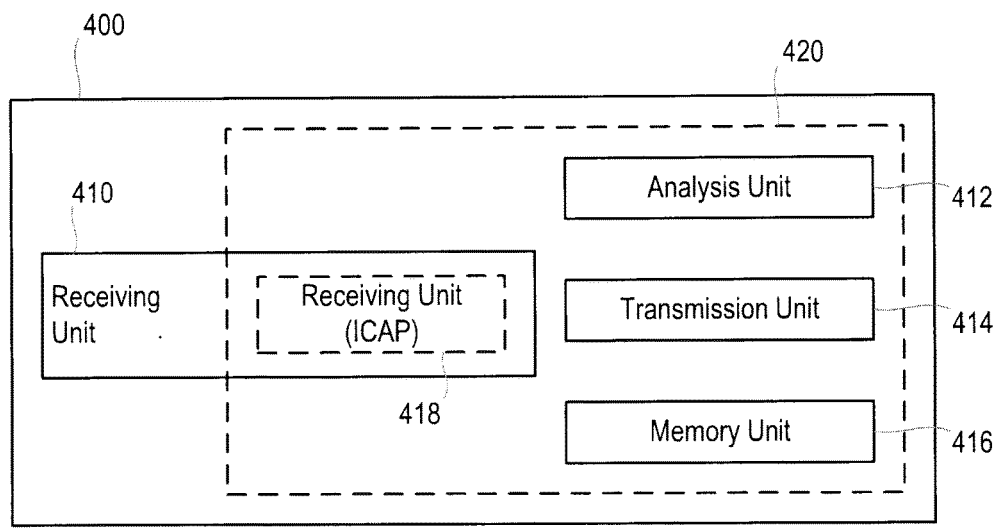
FIG. 5 is a block diagram representing functional units of an ICAP client.

Apparatus for conducting the method of FIG. 4, for example on receipt of suitable computer readable instructions, may be incorporated within an ICAP client node. FIG. 5 illustrates functional units in an ICAP client node 400 which may execute the steps of FIG. 4, for example according to computer readable instructions received from a computer program. It will be understood that the units illustrated in FIG. 5 are functional units, and may be realised in any appropriate combination of hardware and/or software.

With reference to FIG. 5, the ICAP client node 400 comprises a receiving unit 410, an analysis unit 412, a transmission unit 414 and a memory unit 416. The analysis unit 412, transmission unit 414 and memory unit 416 may be grouped, together with a dedicated ICAP sub unit 418 of the receiving unit 410, into an ICAP client proxy module 420 within the client node.

The ICAP receiving unit 418 is configured to receive an OPTIONS mode message from an ICAP server including a message transmission policy, and to store the received message transmission policy in the memory unit 416. The receiving unit 410 is configured to receive a message from an entity other than the ICAP server and to pass the message to the ICAP client proxy module 420 for processing. The analysis unit 412 is configured to check the received message for content type and the transmission unit 414 is configured to implement an appropriate transmission policy by applying the transmission method corresponding to the message content type from the message transmission policy stored in the memory unit 416. In order to identify the appropriate transmission method, the transmission unit 414 may also check whether the message is to be sent in RESPMOD or REQMOD modes.

Figure 6:
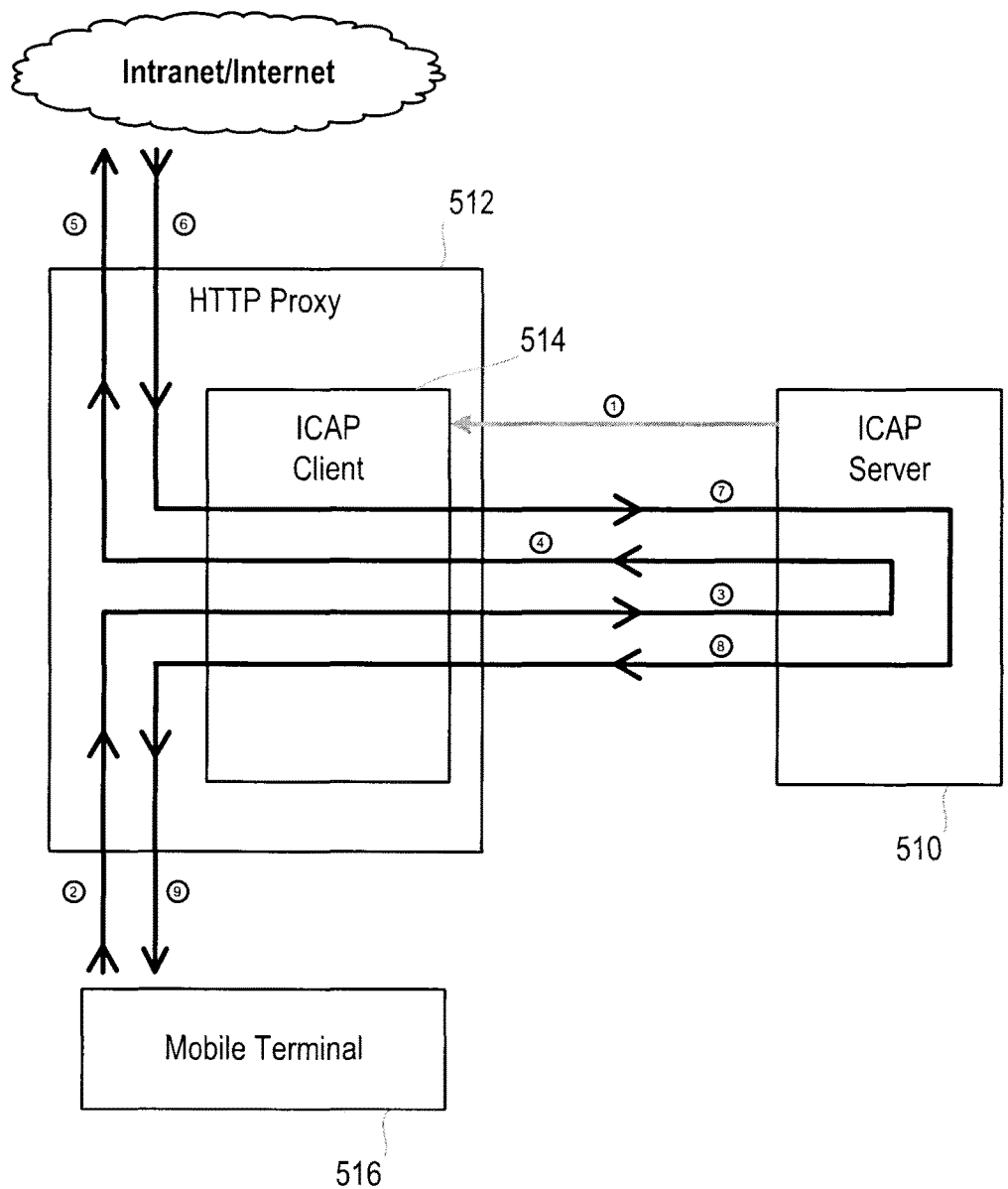
FIG. 6 is a schematic illustration representing operation of an ICAP client and server according to an example of the methods of FIGS. 2 and 4.

FIG. 6 illustrates operation of an ICAP server 510 and ICAP client 514 within an HTTP proxy server 512 in accordance with the methods of FIGS. 2 and 4. In the example of FIG. 6, the ICAP server 510 is supporting resources operating in both REQMOD and RESPMOD modes. In a first step 1, the ICAP server 510 sends an OPTIONS mode response to the ICAP client with configuration information including a message transmission policy. The message transmission policy may be in the form of header field and value pairs as discussed above and illustrated in Table 2. The received message transmission policy is stored within the ICAP client 514. The OPTIONS response may be prompted by an OPTIONS mode request sent by the ICAP client 514 to the ICAP server 510 on start-up of a new connection. Once the OPTIONS mode response is received from the ICAP server, the ICAP client is ready to interact with the ICAP server for the processing of messages from/to an end user.

A request message is received by the HTTP proxy 512 from a mobile terminal 516 in a step 2. In the present example, the request includes a content type header "MMS POST". The HTTP proxy 512 passes the request message to the ICAP client 514 which checks the message against the received message transmission policy for the ICAP server 510. This involves checking for a content type in the message, determining that the message would be forwarded to the ICAP server as a REQMOD message, and then checking the content types listed against the Req-Content-Transfer-* headers received from the ICAP server. In the present example, the ICAP client 514 determines from the longest match principle that the message should be sent to the ICAP server in its entirety, i.e. the header field Req-Content-Transfer-Complete is the longest match for the content type "MMS POST". The ICAP client therefore forwards the request message to the ICAP server 510 in a step 3. The ICAP server processes the received message and returns the processed message to the ICAP client 514 in a step 4. The HTTP proxy 512 then forwards the processed request message to the Internet. In step 6, the HTTP proxy 512 receives a response from the Internet and passes the response to the ICAP client 514. The ICAP client 514 again checks the content type and mode of the message against the received transmission policy to determine whether the response message should be transferred in its entirety to the ICAP server, previewed to the ICAP server or not sent to the ICAP server. For the response message, this involves checking the content types listed against the Resp-Content-Transfer-* headers. In the illustrated example, the ICAP client determines that the response message should be sent to the ICAP server 510 in its entirety, and sends the message in step 7. The ICAP server 510 processes the message and returns the processed message to the ICAP client 514 in step 8. The HTTP proxy 512 then forwards the processed response message to the mobile terminal in step 9.

Aspects of the present invention thus increase efficiency of operation between ICAP client and server, allowing proper use of the preview transfer method and ensuring messages are handled appropriately, being transmitted in their entirety without preview, previewed to the ICAP server or not sent to the ICAP server at all. Messages which are or may be appropriate for ICAP server processing are thus offered to the ICAP server while minimising unnecessary message transmission. A further increase in efficiency is offered by the use of dedicated message transmission policies for RESPMOD and REQMOD operation, reflecting the possibility that different message transmission behaviour may be appropriate for request and response modifications, and that a single ICAP server may provide resources or services supporting different operation modes.

It should be noted that the above-mentioned examples illustrate rather then limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for operating an Internet Content Adaptation Protocol, ICAP, server, the method comprising defining a message transmission policy for clients of the ICAP server according to a content type of messages for transmission to the ICAP server,
   wherein the message transmission policy comprises a specification of messages for which a particular transmission method is to be applied, the transmission method comprising one of sending a message preview, sending the entire message or not sending the message.

2. A method as claimed in claim 1, further comprising defining a plurality of message transmission policies according to a content type of the messages for transmission, each policy concerning a different transmission method.

3. A method as claimed in claim 1, further comprising instructing a client of the ICAP server to apply the defined policy.

4. A method as claimed in claim 3, wherein instructing a client of the ICAP server to apply the defined policy comprises including at least one header conveying the policy in a response message sent to the client when the ICAP server is operating in OPTIONS mode.

5. A method as claimed in claim 1, further comprising specifying a default transmission method in the defined message transmission policy.

6. A method as claimed in claim 1, further comprising defining a fallback message transmission policy for messages for which a content type is not available.

7. A method as claimed in claim 6, wherein the fallback message transmission policy is defined according to a file extension of a Uniform Resource Locator, URL, contained in the message.

8. A method as claimed in claim 1, further comprising defining at least one dedicated message transmission policy for when the ICAP server is operating in Request Modification mode, REQMOD, or for when the ICAP server is operating in Response Modification mode, RESPMOD.

9. A method as claimed in claim 8, wherein:
   instructing a client of the ICAP server to apply the defined policy comprises including at least one header conveying the policy in a response message sent to the client when the ICAP server is operating in OPTIONS mode, and
   the at least one header included in a response message sent to the client when the ICAP server is operating in OPTIONS mode comprises at least one of:
   Resp-Content-Transfer-Preview,
   Resp-Content-Transfer-Ignore,
   Resp-Content-Transfer-Complete,
   Req-Content-Transfer-Preview,
   Req-Content-Transfer-Ignore,
   Req-Content-Transfer-Preview.

10. A method for operating an Internet Content Adaptation Protocol, ICAP, server, the method comprising defining a message transmission policy for clients of the ICAP server to be applied when sending messages to the ICAP server,
    the policy comprising a dedicated message transmission policy for when the ICAP server is operating in Request Modification mode, REQMOD, or for when the ICAP server is operating in Response Modification mode, RESPMOD;
    wherein the message transmission policy comprises a specification of messages for which a particular transmission method is to be used, the transmission method comprising one of sending a message preview, sending the entire message or not sending the message.

11. A method for operating a client of an Internet Content Adaptation Protocol, ICAP, server, the method comprising:
    receiving a message from an entity other than the ICAP server;
    checking the message for a content type; and
    if the message includes a content type, applying a message transmission policy corresponding to the ICAP server according to the content type,
    wherein the message transmission policy comprises a specification of messages for which a particular transmission method is to be used when transmitting to the ICAP server, the transmission method comprising one of sending a message preview, sending the entire message or not sending the message.

12. A method as claimed in claim 11, further comprising, if the message does not include a content type, checking for a file extension of a Uniform Resource Locator, URL, contained in the message, and
    if the message includes a URL having a file extension, applying a transmission policy corresponding to the ICAP server according to the file extension.

13. A method as claimed in claim 11, further comprising receiving a message from the ICAP server including a message transmission policy defined by the ICAP server and storing the received message transmission policy in a memory.

14. A method as claimed in claim 11, further comprising checking whether the received message is to be transmitted to the ICAP server as a Request Modification mode, REQMOD, request or a Response Modification mode, RESPMOD, request, and applying a message transmission policy corresponding to the ICAP server according to the mode type of the request.

15. A method for operating a client of an Internet Content Adaptation Protocol, ICAP, server, the method comprising:

receiving a message from an entity other than the ICAP server;

checking whether the received message is to be transmitted to the ICAP server as a Request Modification mode, REQMOD, request or a Response Modification mode, RESPMOD, request, and applying a message transmission policy corresponding to the ICAP server according to the mode type of the request, wherein the message transmission policy comprises a specification of messages for which a particular transmission method is to be used when transmitting to the ICAP server, the transmission method comprising one of sending a message preview, sending the entire message or not sending the message.

16. A computer program product configured, when run on a computer, to carry out a method according to claim 15.

17. An Internet Content Adaptation Protocol, ICAP, server node, comprising a policy unit configured to define a message transmission policy for clients of the ICAP server according to a content type of messages for transmission to the ICAP server, wherein the message transmission policy comprises a specification of messages for which a particular transmission method is to be applied, the transmission method comprising one of sending a message preview, sending the entire message or not sending the message.

18. An ICAP server node as claimed in claim 17, further comprising an instructing unit, configured to instruct a client of the ICAP server to apply the policy defined in the policy unit.

19. An ICAP server node as claimed in claim 17, wherein the policy unit is further configured to define at least one dedicated message transmission policy for when the ICAP server is operating in Request Modification mode, REQMOD, or for when the ICAP server is operating in Response Modification mode, RESPMOD.

20. An Internet Content Adaptation Protocol, ICAP, client node, comprising:

a receiving unit configured to receive a message from an entity other than the ICAP server of which the node is client;

an analysis unit, configured to check the received message for content type; and a transmission unit configured, if the message includes a content type, to apply a message transmission policy corresponding to the ICAP server of which the node is client according to the content type, wherein the message transmission policy comprises a specification of messages for which a particular transmission method is to be used when transmitting to the ICAP server, the transmission method comprising one of sending a message preview, sending the entire message or not sending the message.

* * * * *